G. C. Westover.
Churn & Ice-Cream Freezer.

N° 73,766. Patented Jan. 28, 1868.

Witnesses.
C. Reigart.
Daniel Reigart.

Inventor.
George C. Westover.
By his Atty J. F. Reigart.

United States Patent Office.

GEORGE C. WESTOVER, OF PADUCAH, KENTUCKY.

*Letters Patent No. 73,766, dated January 28, 1868.*

---

IMPROVEMENT IN COMBINED CHURN AND ICE-CREAM FREEZER.

---

*The Schedule referred to in these Letters Patent and making part of the same.*

---

TO ALL WHOM IT MAY CONCERN:

Be it known that I, GEORGE C. WESTOVER, of Paducah, McCracken county, and State of Kentucky, have invented a "Churn and Ice-Cream Freezer combined;" and I do hereby declare the following to be an exact description thereof, reference being had to the accompanying drawings, and to the letters of reference marked thereon, making a part of this specification, in which—

Figure 1:
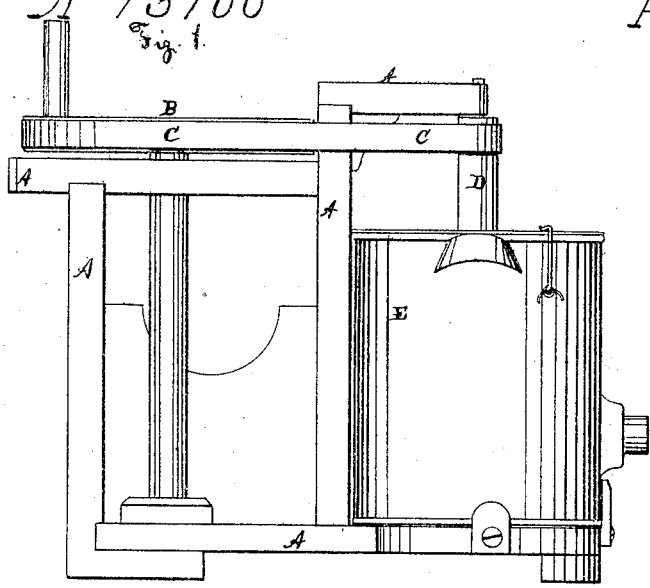

Figure 1 is a perspective view of the churn.

Figure 2:
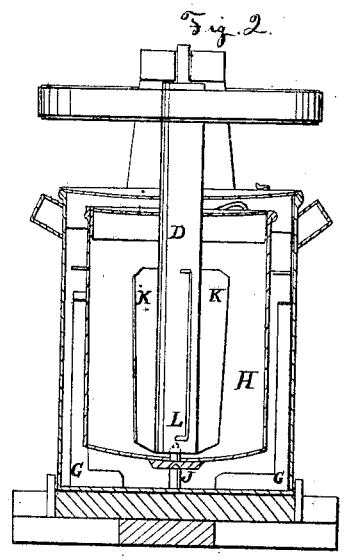

Figure 2, a cross-section, exhibiting the freezer inside of the churn.

Figure 3:
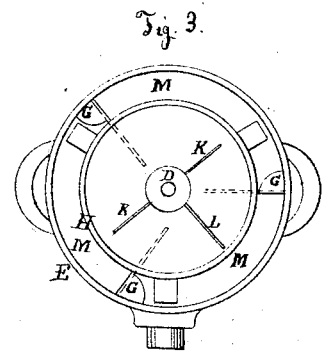

Figure 3, a top view.

Figure 4:
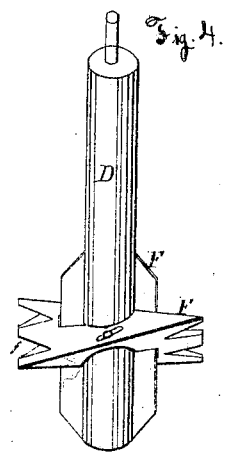

Figure 4, the beater for churning butter.

Figure 5:
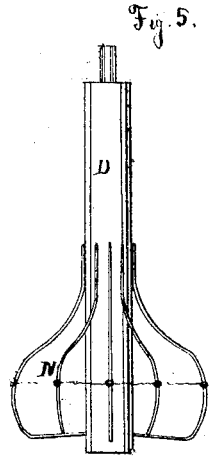

Figure 5, the egg or cream-whip, for frosting for cakes and different kinds of confectionery.

The nature of my invention consists in the double cylinder, the inside being movable, and having a blade and wire for scattering and cutting the cream, and the space between the two cans or cylinders contain ice for freezing the cream, and the egg or cream-whip is designed to work in the churn-cylinder or can when the freezer is removed, and the beater (as shown at fig. 4) is used for churning the butter.

A represents the upright frame that supports the churn; B, the driving-wheel, with its belt, C, that drives the upright shaft D of the churn or cylinder E. F F are the beaters, that are used in the churn or cylinder E for churning the butter, and G G G are the flanges on the inside of the cylinder E for breaking the cream when churning butter.

The above-described churn was patented by me December, 1866, and the following-described devices are the improvements invented by me, viz: H, the inner cylinder or movable can, that contains the cream to be frozen. It has an under step, J, to revolve upon, and likewise an inner shaft, D, that revolves independently on the point of the step J. On this shaft D are two wings or beaters, K K, set opposite to each other, to throw the cream off to the sides of the can H, whilst the bent-wire wing L cuts and scrapes it off till the cream becomes cold and stiff, whilst the can H, turning slowly on its step or pivot J, does not disturb, but keeps the packed ice in the space M close to the side of the can, and effectually freezes the cream. The can can be made of tin or zinc, and the blades or beaters of wood or metal.

Whenever I desire to make butter, I remove the inner cylinder H, with its shaft, and insert the shaft D, with its beaters, F; and to whip eggs or cream for frosting, I use the beaters or wire whip, fig. 5, instead of the beaters F.

The shafts D D D, with the beaters F, wings K and L, and wires N, of the whip, as shown at fig. 5, are all alike, and each revolves on the pivot J, and each is driven by the band C.

What I claim as my invention, and desire to secure by Letters Patent, is—

The revolving inside cylinder H, pivot J, beaters K K, and wire wing L, when arranged, combined, and operated as herein described, and for the purposes set forth.

GEO. C. WESTOVER.

Witnesses:
C. BELL,
P. Y. BELL.